(12) United States Patent
Yu et al.

(10) Patent No.: US 9,071,355 B2
(45) Date of Patent: Jun. 30, 2015

(54) DYNAMIC DISPERSION DETECTING METHOD AND APPARATUS

(75) Inventors: Dezhong Yu, Shenzhen (CN); Fanming Meng, Shenzhen (CN); Junbo Xie, Shenzhen (CN); Yu Xu, Shenzhen (CN); Jiahong Zeng, Shenzhen (CN); Binlin Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 13/476,653

(22) Filed: May 21, 2012

(65) Prior Publication Data
US 2012/0232819 A1 Sep. 13, 2012

Related U.S. Application Data

(63) Continuation of application No. PCT/CN2010/078608, filed on Nov. 10, 2010.

(30) Foreign Application Priority Data

Nov. 19, 2009 (CN) .......................... 2009 1 0222614

(51) Int. Cl.
*H04B 10/2513* (2013.01)

(52) U.S. Cl.
CPC ................................ *H04B 10/25133* (2013.01)

(58) Field of Classification Search
CPC ............... H04B 10/25133; H04B 10/2507; H04B 10/07951; H04B 10/697
USPC ............ 702/66, 69, 79, 189–191; 398/26, 27, 398/29, 147, 149, 159
See application file for complete search history.

(56) References Cited

U.S. PATENT DOCUMENTS

| 6,728,491 | B1 * | 4/2004 | Ooi et al. | ........................ 398/147 |
| 7,869,715 | B2 * | 1/2011 | Ooi et al. | ........................ 398/147 |

(Continued)

FOREIGN PATENT DOCUMENTS

| CN | 1249813 A | 4/2000 |
| CN | 1492250 A | 4/2004 |

(Continued)

OTHER PUBLICATIONS

1st Office Action in corresponding Chinese Patent Application No. 200910222614.3 (Mar. 4, 2013).

(Continued)

*Primary Examiner* — Manuel L Barbee
(74) *Attorney, Agent, or Firm* — Leydig, Voit & Mayer, Ltd.

(57) ABSTRACT

A dynamic dispersion detecting method and apparatus are disclosed. The apparatus includes a tunable dispersion compensation module (101), a demodulator (102), a receiver (103), a partial band radio frequency power detecting unit (104), and an electrical signal ratio calculating unit (105). The method includes: demodulating a phase of a received optical signal; converting the demodulated optical signal into an electrical signal; sampling radio frequency power of the electrical signal to obtain an radio frequency signal; obtaining an electrical signal ratio of the radio frequency signal; and comparing a value of a currently detected electrical signal ratio with the values of the previously detected electrical signal ratios, tuning a dispersion compensation value according to a comparison result to find a peak electrical signal ratio, and obtaining a residual dispersion value of a system according to the peak electrical signal ratio.

18 Claims, 3 Drawing Sheets

(56) References Cited

U.S. PATENT DOCUMENTS

| | | | |
|---|---|---|---|
| 8,229,298 B2 * | 7/2012 | Liu et al. .......................... | 398/29 |
| 2001/0009467 A1 | 7/2001 | Fujita | |
| 2004/0131363 A1 | 7/2004 | Kisaka et al. | |
| 2004/0161243 A1 | 8/2004 | Ooi et al. | |
| 2006/0067699 A1 | 3/2006 | Chandrasekhar et al. | |
| 2011/0286739 A1 * | 11/2011 | Ota .................................. | 398/27 |
| 2012/0020661 A1 * | 1/2012 | Kaburagi et al. ................ | 398/26 |

FOREIGN PATENT DOCUMENTS

| | | | |
|---|---|---|---|
| CN | 1968055 A | 5/2007 |
| CN | 101136707 A | 3/2008 |
| CN | 101286804 A | 10/2008 |
| JP | 2002033701 A | 1/2002 |

OTHER PUBLICATIONS

International Search Report in corresponding International Patent Application No. PCT/CN2010/078608 (Feb. 24, 2011).

Written Opinion of the International Searching Authority in corresponding International Patent Application No. PCT/CN2010/078608 (Feb. 24, 2011).

* cited by examiner

DYNAMIC DISPERSION DETECTING METHOD AND APPARATUS

CROSS-REFERENCE TO RELATED APPLICATIONS

This application is a continuation of International Patent Application No. PCT/CN2010/078608, filed on Nov. 10, 2010, which claims priority to Chinese Patent Application No. 2009/10/222614.3, filed on Nov. 19, 2009, both of which are hereby incorporated by reference in their entireties.

FIELD OF THE INVENTION

The present invention relates to the field of communication technologies, and in particular, to a dynamic dispersion detecting method and apparatus.

BACKGROUND OF THE INVENTION

In an optical communication system, dispersion tolerance is in inverse proportion to the bit rate. As the bit rate increases, the dispersion tolerance of the system decreases rapidly. In the future intelligent global communication network, the add/drop and switching of channels at different nodes will be more and more complex. The receiver is unable to predict the specific path of an optical signal, and therefore the dispersion of a link is indefinite. The residual dispersion value is likely to exceed the dispersion tolerance of the system and therefore seriously impacts the performance of the system. Therefore, how to compensate for the system dispersion dynamically and efficiently becomes a hot spot of research.

In a prior art, the system dispersion is compensated dynamically according to the bit error ratio (BER, Bit Error Ratio) of the code error rate performance caused after a service is connected. Specifically:

Before the service is connected, a tunable dispersion compensator (TDC, Tunable Dispersion Compensator) performs rough tuning for the dispersion compensation and at the same time, an optical receiving module demodulates the signal. The demodulation of the signal is completed when the dispersion of the optical communication system falls within a dispersion window receivable by the optical receiving module.

After the service is connected, the rough tuning of the TDC is stopped, and the BER of the system is collected and fed back to the TDC. The TDC performs fine tuning according to the BER of the system until the fed back BER is minimum in a period of time. The TDC value then may be regarded as the best dispersion compensation value of the system. Thus, a dynamic compensation for the dispersion is completed.

During research and practice of the prior art, the inventor finds the following problems:

Because TDC tuning and signal demodulation are performed simultaneously, it is the case that the demodulation of the signal has not been completed at the same time that the TDC is tuned within the proper dispersion window of the signal, so that the service cannot be connected and the best dispersion window is missed, and then the service is disconnected. As a result, a second TDC search process is performed and the service connection time is prolonged.

The BER can be tuned only after the service is connected and error bits are transmitted. The tuning is slow and adds to the service connection time of the system.

SUMMARY OF THE INVENTION

The technical problem to be addressed by the embodiments of the present invention is to provide a dynamic dispersion detecting method and apparatus to detect the best dispersion of a system and effectively increase the system performance.

In order to address the technical problem described above, one aspect of the embodiments of the present invention provides a dynamic dispersion detecting apparatus that includes a tunable dispersion compensation module, a demodulator, a receiver, a partial band radio frequency power detecting unit, and an electrical signal ratio calculating unit, where:

the tunable dispersion compensation module is configured to send a received optical signal to the demodulator after compensating for the dispersion of the optical signal;

the demodulator is configured to demodulate the phase of the received optical signal;

the receiver is configured to convert the optical signal outputted by the demodulator into an electrical signal;

the partial band radio frequency power detecting unit is configured to sample radio frequency power of the electrical signal converted by the receiver to obtain an radio frequency signal;

the electrical signal ratio calculating unit is configured to obtain an electrical signal ratio of the radio frequency signal and send the electrical signal ratio to the tunable dispersion compensation module continuously; and the tunable dispersion compensation module is configured to compare the value of the currently received electrical signal ratio and the values of the previously received electrical signal ratios, tune a dispersion compensation value according to the comparison result to obtain a peak electrical signal ratio, and determine a residual dispersion value of the system according to the peak electrical signal ratio.

In another aspect, a dynamic dispersion detecting method is provided, including:

demodulating the phase of a received optical signal;

converting the demodulated optical signal into an electrical signal;

sampling radio frequency power of the electrical signal to obtain an radio frequency signal;

obtaining an electrical signal ratio of the radio frequency signal; and comparing the currently detected electrical signal ratio with the previously detected electrical signal ratios, tuning a dispersion compensation value according to the comparison result to find a peak electrical signal ratio, and obtaining a residual dispersion value of the system according to the peak electrical signal ratio.

As can be seen from the above technical solution, an optical signal is converted into an electrical signal, a peak electrical signal error is found, and then the residual dispersion value of the system is obtained according to the peak electrical signal error. Because the dispersion value related to the peak electrical signal error is the best residual dispersion value of the system, the best residual dispersion value of the system may be detected. Because the pulse broadening of the electrical signal error is narrow, the peak electrical signal error can be found more easily. When the best residual dispersion value is determined according to the electrical signal error, the accuracy is high and thus the precision of the system residual dispersion detection is increased. Further, as the detected best residual dispersion is used for dispersion compensation, the signal does not miss the best dispersion window of the system and the reliability is improved. Moreover, the tuning no longer needs to wait until the service is connected and error bits can be transmitted. Therefore, the service connection of the system is faster.

BRIEF DESCRIPTION OF THE DRAWINGS

To illustrate the technical solution in the embodiments of the present invention or in the prior art more clearly, the following describes the accompanying drawings required in the description of the embodiments or the prior art briefly. Apparently, the accompanying drawings illustrate only some exemplary embodiments of the present invention, and those skilled in the art may derive other drawings from these drawings without creative efforts.

DETAILED DESCRIPTION OF THE EMBODIMENTS

To illustrate the technical solution in the embodiments of the present invention or in the prior art more clearly, the following describes the accompanying drawings necessary for the description of the embodiments or the prior art briefly. Apparently, the embodiments described are only exemplary embodiments of the present invention and the present invention is not limited to such embodiments. Based on the embodiments herein, those skilled in the art can derive all of the other embodiments without creative efforts and such other embodiments all fall within the scope of the present invention.

Dispersion detection techniques and compensation play a core role in a dynamic dispersion compensation system. The range and precision of dispersion detection directly decide the range and precision of the dynamic dispersion compensation system. The complexity of dispersion detection also directly decides the total cost of the compensation system. The dispersion tolerance of optical modules at rates above 40 Gbps is low and therefore dispersion compensation is required. How to locate the best dispersion point becomes critical technique for dynamic dispersion compensation.

The embodiments of the present invention provide a dynamic dispersion detecting method and apparatus to detect the best dispersion of the system and effectively increase the system performance.

A dynamic dispersion detecting apparatus provided in an embodiment of the present invention includes: a tunable dispersion compensation module, a demodulator, a receiver, a partial band radio frequency power detecting unit, and an electrical signal ratio calculating unit, wherein:

the tunable dispersion compensation module is configured to send a received optical signal to the demodulator after compensating for the dispersion of the optical signal;

the demodulator is configured to demodulate the phase of the received optical signal;

the receiver is configured to convert the optical signal outputted by the demodulator into an electrical signal;

the partial band radio frequency power detecting unit is configured to sample radio frequency power of the electrical signal converted by the receiver to obtain an radio frequency signal;

the electrical signal error calculating unit is configured to obtain the electrical signal error of the radio frequency signal and send the electrical signal error to the tunable dispersion compensation module continuously;

Specifically, the electrical signal error obtained by the electrical signal error calculating unit is the ratio of the peak to the valley of the radio frequency signal detected in a predetermined period of time.

The tunable dispersion compensation module compares the value of the currently received electrical signal error with the values of the previously received electrical signal errors, tunes the dispersion compensation value according to the comparison result to find the peak electrical signal error, and determines the residual dispersion value of the system according to the peak electrical signal error.

The dynamic dispersion detecting apparatus provided in the embodiment of the present invention converts an optical signal into an electrical signal, finds the peak electrical signal error, and then obtains the residual dispersion value of the system according to the peak electrical signal error. Because the dispersion value related to the peak electrical signal error is the best residual dispersion value of the system, the best residual dispersion value of the system may be detected. Because the pulse broadening of the electrical signal error is narrow, the peak electrical signal error can be found more easily. When the best residual dispersion value is determined according to the electrical signal error, the accuracy is high and thus the precision of system residual dispersion detection is increased. Further, as the detected best residual dispersion is used for dispersion compensation, the signal does not miss the best dispersion window of the system and the reliability is improved. Moreover, the tuning no longer needs to wait until the service is connected and error bits can be transmitted. Therefore, the service connection of the system is faster.

Figure 1:
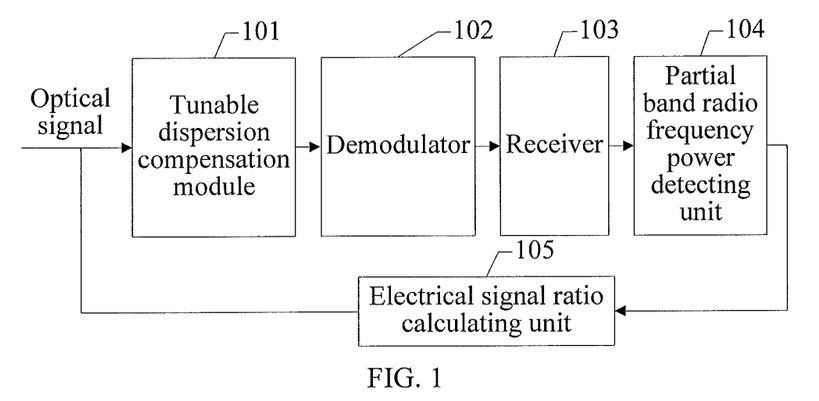
FIG. 1 is a system block diagram of a dynamic dispersion detecting apparatus provided in an embodiment of the present invention.

FIG. 1 is a system block diagram of a dynamic dispersion detecting apparatus provided in an embodiment of the present invention. The apparatus includes a tunable dispersion compensation module (TDCM, TDC Module) 101, a demodulator (DM, Demodulator) 102, a receiver 103, a partial band radio frequency (RF, Radio Frequency) power detecting unit 104, and an electrical signal ratio (ESR, Electrical signal Ratio) calculating unit 105.

After receiving an optical signal, the tunable dispersion compensation module 101 compensates the dispersion of the received optical signal and sends the optical signal to the demodulator 102. At the initial run of the system, the tunable dispersion compensation module 101 has an initial dispersion compensation value which may be preset by a user according to the user experience or be a system preset value.

When receiving the optical signal, the demodulator 102 demodulates the phase of the optical signal.

The receiver 103 is an optical-electrical conversion portion and mainly completes the conversion of the optical signal outputted by the demodulator 102 into an electrical signal.

The partial band radio frequency power detecting unit 104 samples the converted electrical signal at a certain frequency band and calculates the RF power of the electrical signal at the partial band. The partial band radio frequency power detecting unit 104 mainly completes the sampling of RF power of the electrical signal and sends the samples to the electrical signal ratio calculating unit 105. Main components of the partial band radio frequency power detecting unit 104 may include a power detector and a partial filter circuit.

The electrical signal ratio calculating unit 105 is mainly in charge of logic processing, and used to calculate the ESR of the RF signal detected by the partial band radio frequency power detecting unit 104. The ESR is the ratio of the peak RF to the valley RF of the detected RF signal. That is, ESR=peak RF/valley RF. The process of calculating the ESR is a process of continuous calculation. The ESRs of different periods of time may be obtained with the change of time and the calculated ESRs are sent to the tunable dispersion compensation module 101 continuously. The electrical signal ratio calculating unit 105 may be implemented by a microcontroller unit (MCU, Microcontroller Unit) or field programmable gate array (FPGA, Field Programmable Gate Array) component.

After receiving the ESR calculated by the electrical signal ratio calculating unit 105, the tunable dispersion compensation module 101 compares the value of the currently received ESR with the values of the previously received ESRs. If the received ESR keeps rising, the tunable dispersion compensation module 101 continues to tune the dispersion compensation value; and when the received ESR begins to decrease, the tunable dispersion compensation module 101 can determine that a peak ESR that is the maximum ESR has been received already appears in the previously received ESRs. The dispersion value related to the maximum ESR is the best residual dispersion value of the system. Therefore, the tunable dispersion compensation module 101 may determine the residual dispersion value of the system according to the peak ESR, and further, compensate for the residual dispersion of the system according to the residual dispersion value in time and stop tuning the dispersion compensation value.

Specifically, the peak ESR may be determined as follows: When it is found that the received ESR is smaller than the last ESR, the last ESR is regarded as the peak ESR; or when the ESR keeps decreasing in a period of time, the previously received maximum ESR is regarded as the peak ESR to avoid the error caused by the jitter of the ESR.

Specifically, the partial band RF power detecting unit may include:

a square calculator, configured to calculate the square of the electrical signal;

a low-pass filter, configured to perform low-pass filtering on the calculation result of the square calculator;

a mean square calculator, configured to calculate the MS of the filtering result of the LPF;

an amplifier, configured to amplify the RMS and output an radio frequency signal; and an analog/digital converter, configured to convert the radio frequency signal from an analog signal to a digital signal.

Indeed, this is an embodiment of the partial band radio frequency power detecting unit implemented by obtaining radio frequency signal. Other apparatus structures may also be used provided that the structures obtain the radio frequency signal.

The above is a description of the dynamic dispersion detecting apparatus provided in the embodiment of the present invention. The use and principle analysis of the dynamic dispersion detecting apparatus provided in the embodiment of the present invention are described in the dynamic dispersion detecting method provided in the embodiment of the present invention below.

Figure 2:
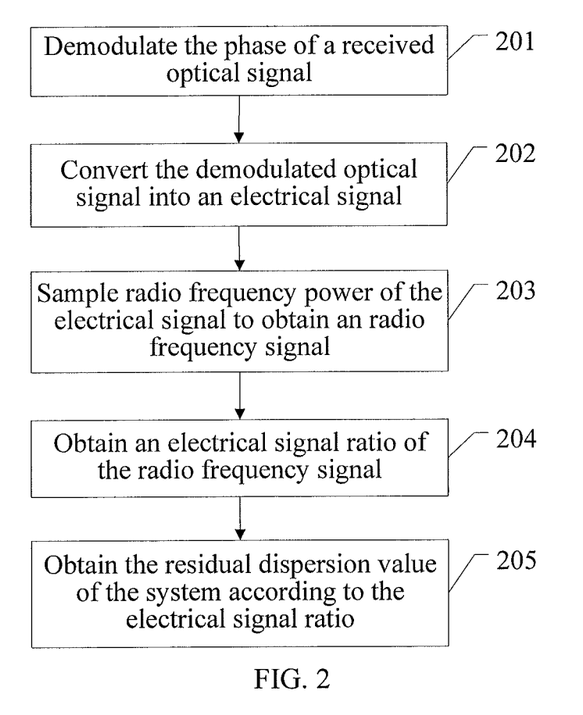
FIG. 2 is a flowchart of a dynamic dispersion detecting method provided in an embodiment of the present invention.

FIG. 2 shows the flow of a dynamic dispersion detecting method provided in an embodiment of the present invention. The method includes the following steps:

201. Demodulate the phase of a received optical signal.

202. Convert the demodulated optical signal into an electrical signal.

203. Sample the radio frequency power of the electrical signal to obtain an radio frequency signal.

204. Calculate the electrical signal ratio of the radio frequency signal.

The electrical signal ratio of the radio frequency signal is obtained. The electrical signal ratio is the ratio of the peak to the valley of the radio frequency signal detected in a predetermined period of time. That is, ESR=peak RF/valley RF. The process of calculating the ESR is a process of continuous calculation. The ESRs of different periods of time may be obtained with the change of time.

205. Obtain the residual dispersion value of the system according to the electrical signal ratio.

The value of the currently detected electrical signal ratio is compared with the values of the previously detected electrical signal ratios. If the received ESR keeps rising, the tuning of the dispersion compensation value is continued. When the received ESR begins to decrease, it may be determined that a peak ESR that is the maximum ESR has been received already appears in the previously received ESRs. The dispersion related to the maximum ESR is the best residual dispersion value of the system and therefore the residual dispersion value of the system may be determined according to the peak ESR.

Specifically, the peak ESR may be determined as follows: When it is found that the received ESR is smaller than the last ESR, the last ESR is regarded as the peak ESR; or when the ESR keeps decreasing in a period of time, the previously received maximum ESR is regarded as the peak ESR to avoid the error caused by the jitter of the ESR.

Further, the residual dispersion of the system may be compensated in time according to the residual dispersion value.

The dynamic dispersion detecting method provided in the embodiment of the present invention converts an optical signal into an electrical signal, finds the peak electrical signal ratio, and then obtains the residual dispersion value of the system according to the peak electrical signal ratio. Because the dispersion value related to the peak electrical signal ratio is the best residual dispersion value of the system, the best residual dispersion value of the system may be detected. Because the pulse broadening of the electrical signal ratio is narrow, the peak electrical signal ratio can be found more easily. When the best residual dispersion value is determined according to the electrical signal ratio, the accuracy is high and thus the precision of system residual dispersion detection is increased. Further, as the detected best residual dispersion is used for dispersion compensation, the signal does not miss the best dispersion window of the system and the reliability is improved. Moreover, the tuning no longer needs to wait until the service is connected and error bits can be transmitted. Therefore, the service connection of the system is faster.

A mapping relation between the electrical signal ratio and the residual dispersion value is discussed hereunder.

As shown in FIG. 1, the demodulator 102 receives an optical signal. Since the group velocity of different frequency components and different mode components of a signal transmitted by a fiber is different, different delays arise over the same transmission distance to cause distortion of the transmitted signal most of which is pulse broadening. The transmitted signal is regarded as a Gauss signal. $T_o$ is set to the initial signal width in the time domain and T is set to the signal width in the time domain, T rises as the transmission distance Z increases. The relation between T and Z is described in equation (1).

$$T_1(Z) = T_0[1+(z/L_D)^2]^{1/2} \qquad \text{equation (1)}$$

where: $L_D = T_0^2/|\beta_2|$

The broadening of the signal width T causes the decrease of the amplitude of the signal power U. The relation between U and T is described in equation (2).

$$U(z, T) = \frac{T_0}{(T_0^2 - I\beta_2 z)^{1/2}} \exp\left(-\frac{T^2}{2(T_0^2 - I\beta_2 z)}\right) \quad \text{equation (2)}$$

If the transmission distance Z and β2 in equation (2) are indicated by the cumulative dispersion d, U may be expressed in equation (3).

$$U(d, T) = \frac{T_0}{\left(T_0^2 - i\frac{\lambda_2 d}{2\pi c}\right)^{1/2}} \exp\left(-\frac{T^2}{2\left(T_0^2 - i\frac{\lambda_2 d}{2\pi c}\right)}\right) \quad \text{equation (3)}$$

Figure 3:
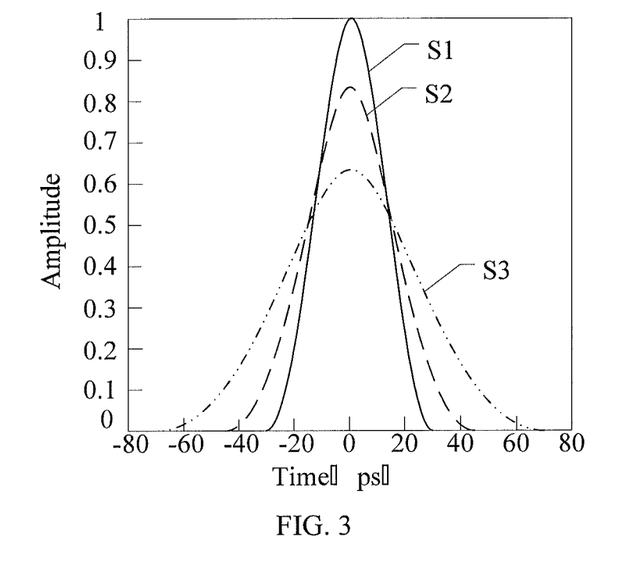
FIG. 3 is a graph of relation between the signal amplitude and the cumulative dispersion d.

It is known from equation (3) that the cumulative dispersion d broadens the signal pulse in the time domain. The broadening size depends on the cumulative dispersion d. FIG. 3 shows the relation curves between the signal amplitude and the cumulative dispersion d.

Curve S1 is a normalized signal amplitude curve under the cumulative dispersion of 0 ps/nm; Curve S2 is a normalized signal amplitude curve under the cumulative dispersion of 68 ps/nm; and Curve S3 is a normalized signal amplitude curve under the cumulative dispersion of 136 ps/nm.

As shown in FIG. 3, the signal amplitude decreases obviously with the increase of its cumulative dispersion. The light extinction ratio (Ex) of an optical signal is defined as a ratio of the peak power to the valley power of the signal. The greater the cumulative dispersion, the smaller the signal amplitude, and the lower the light extinction ratio of the optical signal.

Electrical power detection detects the power of an electrical signal outputted by an optical-electrical detecting device after an optical pulse signal is processed. The receiver 103 is an optical-electrical detecting device. Chromatic dispersion broadens the optical pulse carried in the optical fiber and only changes the phase of each spectrum component without any adverse impact on the spectrum of the optical pulse. The receiver 103 detects the light intensity of the input optical signal and ignores the phase change of the optical signal, and converts the input optical pulse into an electrical pulse. The spectrum of the electrical pulse is narrowed with the broadening of the optical pulse envelope. As a result, the electrical power at a given frequency point changes with the chromatic dispersion.

The receiver 103 converts the received optical signal into an electrical signal so that the incident optical power is efficiently converted into a photocurrent. An important parameter of the receiver 103 is the responsibility defined as R=Ip/$P_0$, where $P_0$ is the optical power of the incident light received by the light detector and Ip is the intensity of the generated photocurrent. The optical power $P_0$ is in direct proportion to the square of the optical pulse envelope U(z, T). Therefore, when the input optical signal is an optical pulse sequence defined by equation (2), the optical power $P_0$ may be expressed in equation (4).

$$P_0(d, T) = |U(z, T)|^2 = \frac{T_0^2}{\left(T_0^4 + \frac{\lambda^4 d^2}{4\pi^2 c^2}\right)^{1/2}} \exp\left(-\frac{T^2 T_0^2}{\left(T_0^4 + \frac{\lambda^4 d^2}{4\pi^2 c^2}\right)}\right) \quad \text{equation (4)}$$

The electrical signal I outputted by the receiver 103 may be expressed in equation (5).

$$I(d, T) = R*P_0(d, T) = R*\left[\frac{T_0^2}{\left(T_0^4 + \frac{\lambda^4 d^2}{4\pi^2 c^2}\right)^{1/2}} \exp\left(-\frac{T^2 T_0^2}{\left(T_0^4 + \frac{\lambda^4 d^2}{4\pi^2 c^2}\right)}\right)\right] \quad \text{equation (5)}$$

Meanwhile, the spectrum of the electrical signal I(d,T) may be obtained and can be expressed in equation (6).

$$\overset{\square}{I}(d, \omega) = \sqrt{2\pi^4} \sqrt{\left(T_0^4 + \frac{\lambda^4 d^2}{4\pi^2 c^2}\right)} \exp\left[-\frac{1}{2}\left(T_0^2 + \frac{\lambda^4 d^2}{4\pi^2 c^2}\right)\omega^2\right] \quad \text{equation (6)}$$

From equation (6), it is known that the chromatic dispersion changes the spectrum of the electrical signal although it does not impact the spectrum of the optical pulse signal adversely. Therefore, through the analysis of the relation between the cumulative dispersion and the electrical signal spectrum, the cumulative chromatic dispersion in the optical communication system may be obtained by checking the spectrum of the electrical signal.

Figure 4:
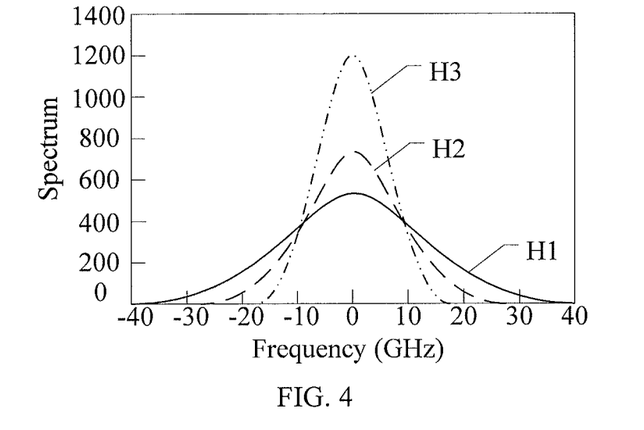
FIG. 4 is the emulation curves of the electrical signal spectrum under different dispersion values.

FIG. 4 is the emulation curves of the electrical signal spectrum under different dispersion values. Curve H1 is an emulation curve of the electrical signal spectrum under the cumulative dispersion of 0 ps/nm; Curve H2 is an emulation curve of the electrical signal spectrum under the cumulative dispersion of 68 ps/nm; and Curve 113 is an emulation curve of the electrical signal spectrum under the cumulative dispersion of 136 ps/nm.

As shown in FIG. 4, the spectrum density at each frequency point throughout the entire spectrum changes with the cumulative dispersion. Therefore, the spectrum density of a given frequency point or the ESR of electrical power at a given band may be detected and used as a feedback signal for dynamic chromatic dispersion compensation so as to monitor the change of cumulative dispersion in the optical fiber communication system and control the compensation value of the dynamic chromatic dispersion compensating device.

Figure 5:
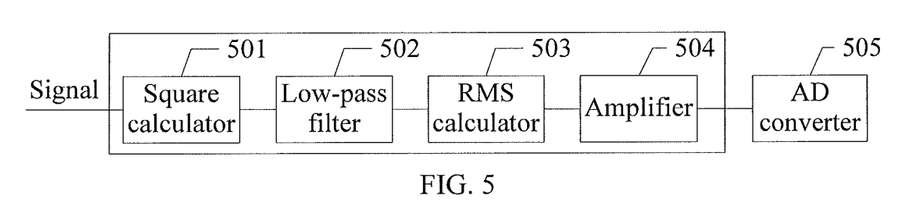
FIG. 5 is a structure diagram of a partial band radio frequency power detecting unit provided in an embodiment of the present invention.

FIG. 5 shows a structure of the partial band radio frequency power detecting unit 104 provided in an embodiment of the present invention. The partial band radio frequency power detecting unit 104 includes a square calculator 501, a low-pass filter (LPF, low-pass filter) 502, a mean square (RMS, mean square) calculator 503, an amplifier (AMP, Amplifier) 504, and an analog/digital converter (AD converter) 505.

Specifically, the square calculator 501, low-pass filter 502, mean square calculator 503, and amplifier 504 constitute a power detector. The detection of electrical power is mainly completed by the power detector.

After the electrical signal Xi enters the power detector, the square calculator 501 calculates the square of the electrical signal, $X^2$, first. Xi is the square of the optical signal U(z,T).

Then the low-pass filter 502 performs low-pass filtering.

The mean square calculator 503 calculates the RMS after the filtering. The RMS is the square root of the average of the squares of a set of numbers. The formula to calculate the RMS is: RMS=$[(X1^2+X2^2+ \ldots +Xn^2)/n]^{-1/2}$.

After the RMS is obtained, the amplifier 504 with the gain G amplifies the signal and outputs the signal $RF_{out}$. The signal $RF_{out}$ may be expressed in the following equation.

$$RF_{out} = G * \sqrt{\frac{\sum_{i=1}^{n} x_i^2}{n}}$$

After receiving the $RF_{out}$, the analog/digital converter 505 converts it from an analog signal to a digital signal and outputs the digital signal to the electrical signal ratio calculating unit.

As known from the above description, the power detector is a linear transfer function of signal amplitude. According to the above description, when the residual dispersion value of the system is higher, the amplitude of the signal is smaller, the light extinction ratio of the signal is lower, and after the RF power detector obtains the RMS, the calculated ESR which is the ratio of the peak power to the valley power will be lower. In contrast, when the residual dispersion value of the system is lower, the calculated ESR will be higher. This means that the maximum ESR is related to the minimum residual dispersion value of the system, that is, the best dispersion compensation value of the system. The tunable dispersion compensation module tunes the dispersion compensation value according to a fedback ESR until it determines that the fedback ESR is the peak. Then the tunable dispersion compensation module uses the dispersion value related to the peak ESR to make the dispersion compensation.

Figure 6:
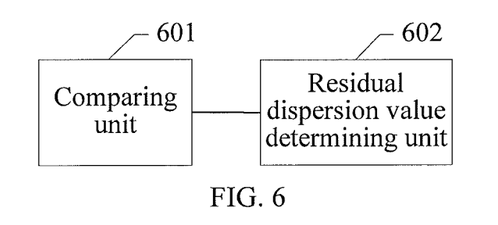
FIG. 6 is a structure diagram of a tunable dispersion compensation module provided in an embodiment of the present invention.

FIG. 6 shows a structure of the partial band RF power detecting unit 104 provided in an embodiment of the present invention. The partial band radio frequency power detecting unit 101 includes:

a comparing unit 601, configured to: compare the value of the currently received electrical signal ratio with the values of the previously received electrical signal ratios; continue to tune the dispersion compensation value when the received electrical signal ratio increases; and use the maximum received electrical signal ratio as the peak electrical signal ratio when the received electrical signal ratio begins to decrease; and a residual dispersion value determining unit 602, configured to determine the residual dispersion value of the system according to the peak electrical signal ratio.

Those skilled in the art may understand that all or part of the steps in the method according to the above-described embodiments can be implemented by a related hardware under the instruction of a program. The program may be stored in a computer readable storage medium. When the program runs, the following steps are executed:

A dynamic dispersion detecting method, including:
demodulating the phase of a received optical signal;
converting the demodulated optical signal into an electrical signal;
sampling the radio frequency power of the electrical signal to obtain an radio frequency signal;
calculating the electrical signal ratio of the radio frequency signal; and
comparing the value of the currently detected electrical signal ratio with the values of the previously detected electrical signal ratios, tuning the dispersion compensation value according to the comparison result to find a peak electrical signal ratio, and obtaining the residual dispersion value of the system according to the peak electrical signal ratio.

The above mentioned storage medium may be a read only memory, a magnetic disk, or a compact disc.

A dynamic dispersion detecting method and apparatus provided in the present invention is described above in detail. Although the principle and implementation of the present invention are described with reference to exemplary embodiments, the embodiments are only intended to help understand the method and core idea of the present invention. In addition, persons of ordinary skill in the art may make modifications and variations to the implementation and applicability of the present invention according to the idea of the present invention. Therefore, the specification shall not be construed as a limitation on the present invention.

What is claimed is:

1. A dynamic dispersion detecting apparatus, comprising a tunable dispersion compensation module, a demodulator, a receiver, a partial band radio frequency power detecting unit, and an electrical signal ratio calculating unit, wherein:
   the tunable dispersion compensation module is configured to send a received optical signal to the demodulator after compensating for a dispersion of the optical signal;
   the demodulator is configured to demodulate a phase of the received optical signal;
   the receiver is configured to convert the optical signal outputted by the demodulator into an electrical signal;
   the partial band radio frequency power detecting unit is configured to sample radio frequency power of the electrical signal converted by the receiver to obtain a radio frequency signal;
   the electrical signal ratio calculating unit is configured to obtain an electrical signal ratio of the radio frequency signal and send the electrical signal ratio to the tunable dispersion compensation module continuously; and
   the tunable dispersion compensation module is configured to compare a value of the currently received electrical signal ratio and the values of the previously received electrical signal ratios, tune a dispersion compensation value according to a comparison result to obtain a peak electrical signal ratio, and determine a residual dispersion value of a system according to the peak electrical signal ratio.

2. The dynamic dispersion detecting apparatus according to claim 1, wherein the partial band radio frequency power detecting unit comprises:
   a square calculator, configured to calculate a square of the electrical signal;
   a low-pass filter, configured to perform low-pass filtering on a calculation result of the square calculator;
   a mean square calculator, configured to calculate a mean square of a filtering result of the low-pass filter;
   an amplifier, configured to amplify the mean square calculated by the mean square calculator and output an radio frequency signal; and
   an analog/digital (AD) converter, configured to convert the radio frequency signal from an analog signal to a digital signal.

3. The dynamic dispersion detecting apparatus according to claim 2, wherein:
   the tunable dispersion compensation module is further configured to compensate the dispersion of the system according to the residual dispersion value of the system.

4. The dynamic dispersion detecting apparatus according to claim 2, wherein the electrical signal ratio obtained by the electrical signal ratio calculating unit is a ratio of the peak to the valley of the radio frequency signal detected in a predetermined period of time.

5. The dynamic dispersion detecting apparatus according to claim 2, wherein the tunable dispersion compensation module comprises:
   a comparing unit, configured to: compare the value of the currently received electrical signal ratio with the values of the previously received electrical signal ratios; continue to tune the dispersion compensation value when the received electrical signal ratio increases; and use a maximum received electrical signal ratio as the peak electrical signal ratio when the received electrical signal ratio begins to decrease; and a residual dispersion value determining unit, configured to determine the residual dispersion value of the system according to the peak electrical signal ratio.

6. The dynamic dispersion detecting apparatus according to claim 2, wherein the residual dispersion value determining unit is configured to find a dispersion value related to the peak electrical signal ratio, wherein the dispersion value is the residual dispersion value of the system.

7. The dynamic dispersion detecting apparatus according to claim 1, wherein:

the tunable dispersion compensation module is further configured to compensate the dispersion of the system according to the residual dispersion value of the system.

8. The dynamic dispersion detecting apparatus according to claim 1, wherein the electrical signal ratio obtained by the electrical signal ratio calculating unit is a ratio of the peak to the valley of the radio frequency signal detected in a predetermined period of time.

9. The dynamic dispersion detecting apparatus according to claim 1, wherein the tunable dispersion compensation module comprises:

a comparing unit, configured to: compare the value of the currently received electrical signal ratio with the values of the previously received electrical signal ratios; continue to tune the dispersion compensation value when the received electrical signal ratio increases; and use a maximum received electrical signal ratio as the peak electrical signal ratio when the received electrical signal ratio begins to decrease; and a residual dispersion value determining unit, configured to determine the residual dispersion value of the system according to the peak electrical signal ratio.

10. The dynamic dispersion detecting apparatus according to claim 1, wherein the residual dispersion value determining unit is configured to find a dispersion value related to the peak electrical signal ratio, wherein the dispersion value is the residual dispersion value of the system.

11. A dynamic dispersion detecting method utilizing a dynamic dispersion detecting apparatus, the method comprising:

demodulating, by a demodulator of the dynamic dispersion detecting apparatus, a phase of a received optical signal;

converting, by a receiver of the dynamic dispersion detecting apparatus, the demodulated optical signal into an electrical signal;

sampling, by a partial band radio frequency power detecting unit of the dynamic dispersion detecting apparatus, radio frequency power of the electrical signal to obtain a radio frequency signal;

obtaining, by an electrical signal ratio calculating unit of the dynamic dispersion detecting apparatus, an electrical signal ratio of the radio frequency signal; and comparing, by a tunable dispersion compensation module of the dynamic dispersion detecting apparatus, a value of a currently detected electrical signal ratio with the values of the previously detected electrical signal ratios, tuning a dispersion compensation value according to a comparison result to find a peak electrical signal ratio, and obtaining a residual dispersion value of a system according to the peak electrical signal ratio.

12. The method according to claim 11, wherein the sampling radio frequency power of the electrical signal to obtain a radio frequency signal comprises:

calculating a square of the electrical signal; performing low-pass filtering on the calculated square; calculating a mean square of a low-pass filtering result; amplifying the mean square and outputting an radio frequency signal; and converting the radio frequency signal from an analog signal to a digital signal.

13. The method according to claim 12, further comprising: compensating a residual dispersion of the system according to the residual dispersion value.

14. The method according to claim 12, wherein the electrical signal ratio obtained by the electrical signal ratio calculating unit is a ratio of the peak to the valley of the radio frequency signal detected in a predetermined period of time.

15. The method according to claim 12, wherein the comparing the value of a currently detected electrical signal ratio with the values of the previously detected electrical signal ratios and tuning the dispersion compensation value according to the comparison result to find the peak electrical signal ratio comprises:

comparing the value of the currently detected electrical signal ratio with the values of the previously detected electrical signal ratios; continuing to tune the dispersion compensation value when the detected electrical signal ratio increases; and using a maximum detected electrical signal ratio as the peak electrical signal ratio when the detected electrical signal ratio begins to decrease.

16. The method according to claim 11, further comprising: compensating a residual dispersion of the system according to the residual dispersion value.

17. The method according to claim 11, wherein the electrical signal ratio obtained by the electrical signal ratio calculating unit is a ratio of the peak to the valley of the radio frequency signal detected in a predetermined period of time.

18. The method according to claim 11, wherein the comparing the value of a currently detected electrical signal ratio with the values of the previously detected electrical signal ratios and tuning the dispersion compensation value according to the comparison result to find the peak electrical signal ratio comprises:

comparing the value of the currently detected electrical signal ratio with the values of the previously detected electrical signal ratios; continuing to tune the dispersion compensation value when the detected electrical signal ratio increases; and using a maximum detected electrical signal ratio as the peak electrical signal ratio when the detected electrical signal ratio begins to decrease.

* * * * *